Jan. 3, 1950     F. MARIANO     2,493,493
AUTOMOBILE PARKING SYSTEM
Filed Nov. 15, 1946     3 Sheets-Sheet 1

INVENTOR.
FRANK MARIANO
BY
ATTORNEY

Jan. 3, 1950      F. MARIANO      2,493,493
AUTOMOBILE PARKING SYSTEM

Filed Nov. 15, 1946      3 Sheets-Sheet 2

INVENTOR.
FRANK MARIANO
BY
ATTORNEY

Jan. 3, 1950        F. MARIANO        2,493,493
AUTOMOBILE PARKING SYSTEM

Filed Nov. 15, 1946        3 Sheets-Sheet 3

*INVENTOR.*
FRANK MARIANO
BY
*ATTORNEY*

Patented Jan. 3, 1950

2,493,493

UNITED STATES PATENT OFFICE 2,493,493

AUTOMOBILE PARKING SYSTEM

Frank Mariano, Long Island City, N. Y.

Application November 15, 1946, Serial No. 709,959

5 Claims. (Cl. 214—16.1)

This invention relates to automobile parking systems and more particularly to an elevator and its automobile handling mechanisms.

It is an object of the present invention to provide a parking system wherein once the car has been deposited upon an elevator, the parking thereafter of the car is done by automatic car handling mechanisms.

It is another object of the present invention to provide a parking system wherein the driver can lock the car upon leaving the same, and the car remains locked from that time on while it is being parked and until it is delivered to the driver.

It is another object to provide automobile handling mechanisms for controlling the position of a car upon the elevator by connection with the front and rear bumpers thereof, and the same mechanism also serving for moving the car between the elevator and the parking space or off and on the elevator.

According to the invention, a building is put up with three longitudinal sections, the intermediate section serving to provide a series of elevators side by side, and the outer sections being adapted to receive the cars from the elevators, and as storage space therefor. On the bottom floor, one outer section is not provided with stalls but serves to admit the ingoing and outgoing cars being parked and delivered. Before the car enters the elevator the ignition, windows and doors are locked and the brakes are left released. The elevator takes the automobile to the parking level and with its parking mechanism on the elevator, which has retained the car thereon during the upward movement of the elevator, the car is pushed off the elevator proper to locate the car in the parking stall.

The contact of the mechanism with the car is upon the outer faces of the front and rear bumpers. The car is gently pushed from the elevator and thereafter the mechanism is removed and returned to the elevator, and the elevator is returned to the ground level to pick up another car or to another level to pull a car from its stall and take it with it upon its return to the ground level. Only when the driver calls for the car does the car ever move from its parking space or stall. No one ever drives or sits in the car and the car is locked.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Figure 1:
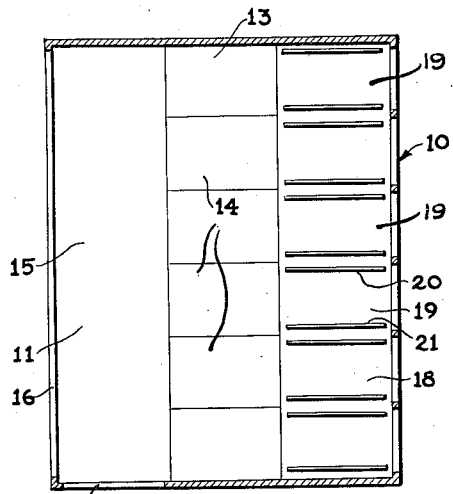
Fig. 1 is a floor plan view of the ground floor of a parking building, there being no stalls on one section inasmuch as the cars leave the elevators from this section.
Figure 2:
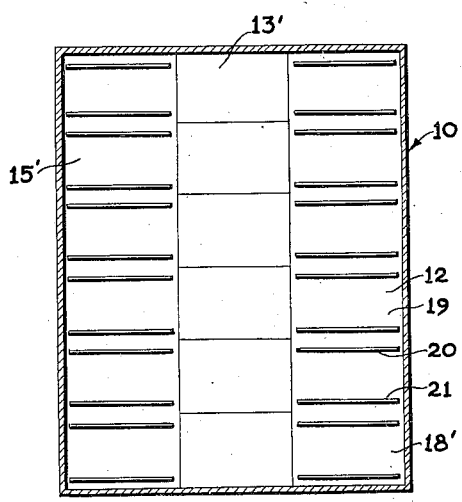
Fig. 2 is a floor plan view of the upper parking levels where both outer sections are used for parking.
Figure 3:
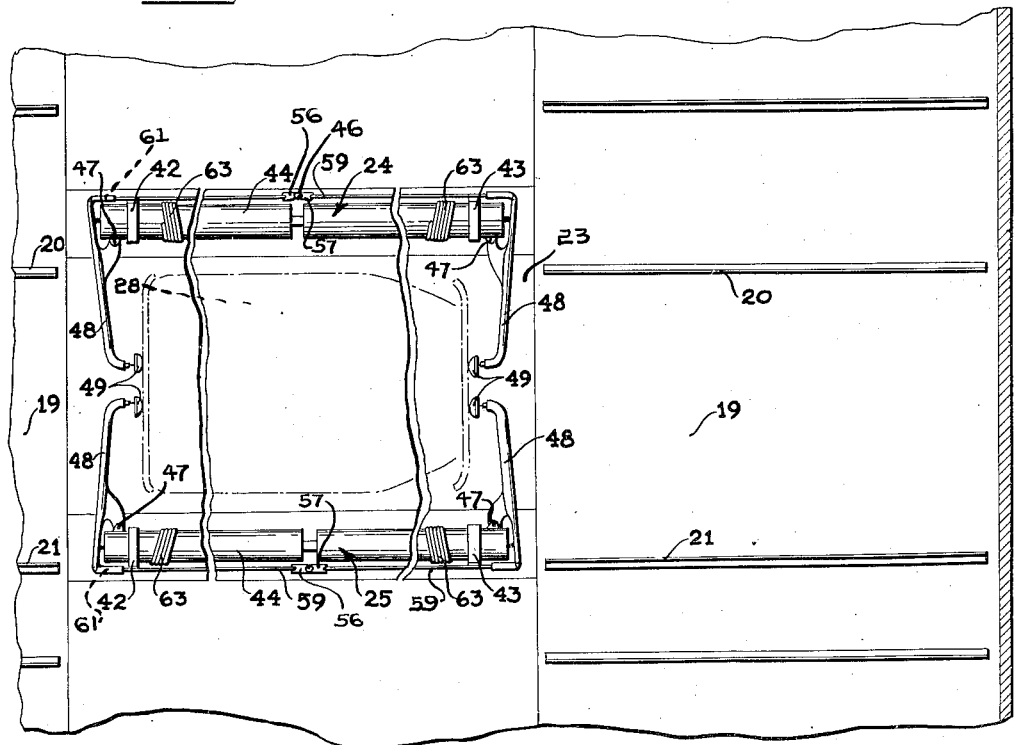
Fig. 3 is a fragmentary view of one floor of the building looking in plan upon an elevator and its parking mechanism.
Figure 4:
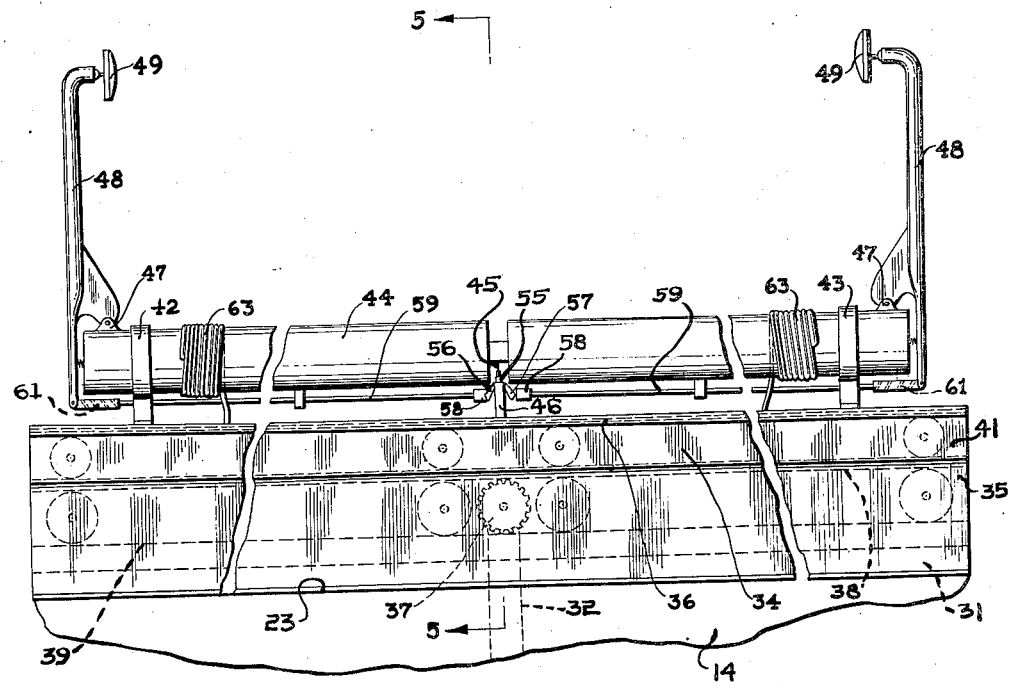
Fig. 4 is a side elevational view of the elevator and the car handling or parking mechanism thereon.

Referring now to the drawings and particularly to Figs. 1 and 2, 10 represents a building structure having a ground floor level 11 and upper floor levels 12 (Fig. 2). The ground floor level comprises an intermediate section 13 in which elevators 14 are disposed side by side throughout the length of the section. Cars are driven out of the building from side section 15 through a door opening space 16 on the long side of the building or through an opening 17 on one end of the building, if the building is situated upon a street corner. At the opposite side of the building is the entrance section 18 with sections or stalls 19 between spaced guide rails 20 and 21.

The upper floor levels have the intermediate section 13' through which the elevators are extended and have two parking sections 15' and 18' at opposite sides thereof. Each section has the usual parking stalls 19 and the guide rails 20 and 21. If desired, the building can be of skeletonized construction but is preferably closed in to protect the cars from the elements.

Figure 6:
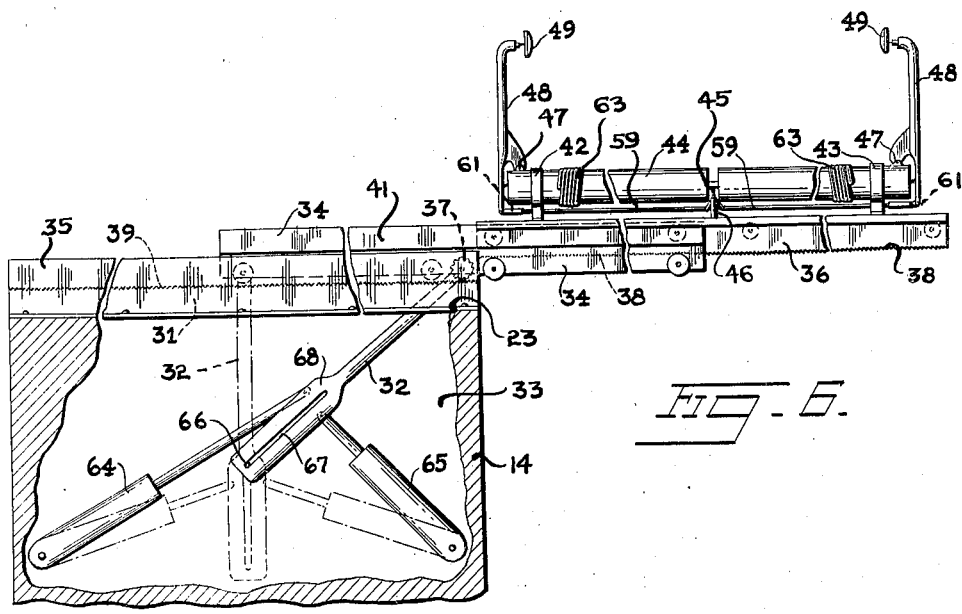
Fig. 6 is a fragmentary side elevational view of the elevator with the parking mechanism extended laterally to place the car in its stall or to pick up the car for returning the same to the elevator.
Figure 7:
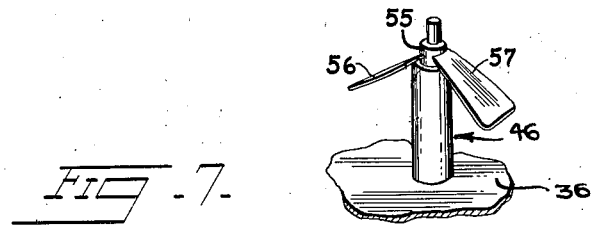
Fig. 7 is a fragmentary perspective view of a portion of the elevator and the hydraulic cylinder for effecting the operation of the bumper contacting elements.

Referring now particularly to Figs. 6 to 7 showing the elevator and its car handling mechanism, 23 represents the top part of the elevator or floor on which the car is supported. On this floor and at opposite sides thereof, are car handling units 24 and 25 adapted to engage the front and rear bumpers of a car, indicated at 28, and resting upon the floor 23 of the elevator. Each of these car handling units comprises a base member 31 having an opening therein longitudinally thereof, through which is extended a driver arm 32 extending upwardly through a longitudinal opening 33 of the elevator 14. Resting upon the support 31, is a wheeled carriage 34. This carriage will ride outwardly over the base 31 and is guided and retained thereon by inwardly flanged side plates 35 and 35'. Slidable over the inwardly flanged side plates is a second carriage 36 which is operated by a gear 37 to extend or be made to travel one half its length relative to the carriage 34, while the carriage 34 is being required to travel one half its length from the end of the supporting base 31. The second carriage 36 has a rack tooth formation 38, and the base 31 has a rack formation 39. The gear 37 is extended between the rack formations and is driven by the stationary rack 39 as the first carriage is moved outwardly by the driver 32. The gear 37, in turn, will rotate in such direction as to cause the second carriage 36 to be extended, as shown in Fig. 6, while the first carriage is extended one half its length over the end of the elevator. The driver element 32 connects with some part on the carriage 34 to move the same outwardly which has portions 41 extending upwardly about the second carriage 36. On the top of the second carriage 36 are brackets 42 and 43 having bearing units to which a long cylinder structure 44 is journalled for rotation about its axis. Intermediate the length of the cylinder, there is a narrow portion from which extends an arm 45 adapted to be connected with a fluid cylinder 46 by which the cylinder 44 may be rotated through ninety degrees.

Figure 5:
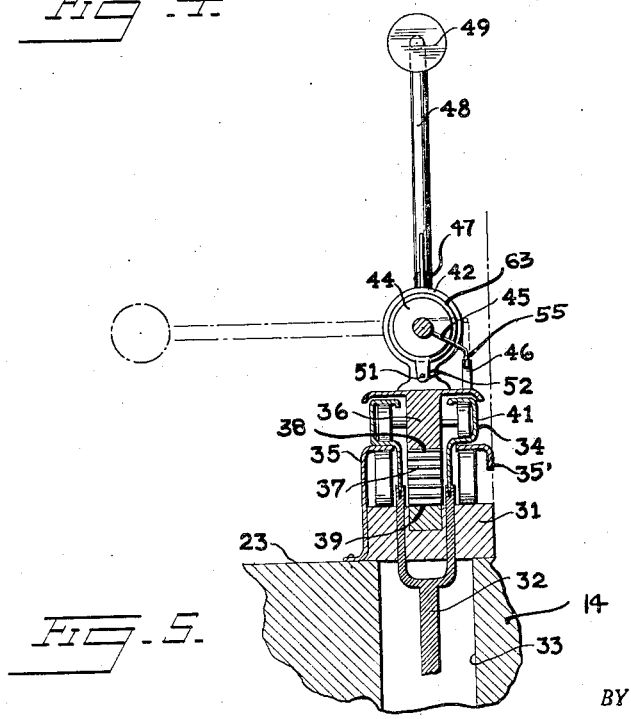
Fig. 5 is a fragmentary cross sectional view taken through one side of the elevator and the parking element at that side, and as viewed along the line 5—5 of Fig. 4 looking in the direction of the arrows thereof.

On opposite ends of the cylinder, there are respectively pivoted, as indicated at 47, bumper contacting arms or elements 48 with contact pads 49 thereon. Normally these arms extend vertically when out of contact with the car and are stopped in this position by pins 51 entering slots 52 (Fig. 5) as the cylinder 44 is returned by the fluid cylinder device 46. When the car is on the elevator and ready to be parked, the fluid cylinder 46 is extended so that the arms 48 are rotated into a horizontal position and the contact pads 49 placed in alignment with the respective front and rear bumpers of the car.

To make certain of the contact of the pads 49 with the bumpers and to prevent any slight movement of the car upon the elevator or to adapt the arms to different car lengths, means is provided for pivoting the arms inwardly about their pivots 47. Associated with the fluid cylinder device 46 (Fig. 7) is a second cylinder device 55 carrying cams 56 and 57 adapted to act upon rollers 58 on shafts 59 extending toward the opposite ends of the cylinder device 44 and rotatable therewith to cause their outward movement to pivot the arms 48 inwardly. Between each of the rods and its engagement with the arms is a spring 61 which gives flexibility to the arm to protect the car and at the same time, protect the arm operating parts from rupture. As the cylinder device is rotated, the rollers 58 are brought into contact with the cams 56 and 57 and thereafter second cylinder 55 is operated to raise the cams and cause the outward movement of the rods 59. Wrapped about the cylinder device are coil return springs 63 which are connected between the cylinder device and some fixed point on the upper carriage 36 whereby to return the cylinder device and extend the arms upright when the fluid within its cylinder operating device is released.

Within the opening 33 of the elevator with the driver element 32, are fluid actuators 64 and 65 located respectively at opposite sides of the driver element, with the actuator 64 serving to pivot the driver 32 to eject the car from the elevator, and the actuator 65 serving to return the car to the elevator. To control the movement of the driver element there is provided a pin 66 in the opening 33 extending into an elongated slot 67 of a widened portion 68 of the element 32.

It should now be apparent that there has been provided a simple and practical parking arrangement for automobiles, wherein space has been conserved and wherein the cars can be parked without the need of a driver and can be left in a locked condition and the device may be used at the floor or at the top of the elevator as desired.

It is to be understood that this device may be operated by an electric motor with suitable cams instead of the hydraulic arrangement.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In an automobile parking arrangement, a building structure having a section adapted to permit the vertical travel on elevators and a section to one side of the first section adapted to receive and store the automobiles, an elevator disposed in said first section for vertical travel adapted to receive an automobile and be elevated to a parking section, car handling mechanism upon the elevator including arms adapted to be rotated from a vertical position to a horizontal position to engage opposite ends of the automobile positioned on the elevator, said mechanism adapted to be extended off the elevator to push the automobile into an adjacent parking space and onto the elevator to pull an automobile from the parking section, and means on the elevator for actuating said car handling mechanism, said car handling mechanism including two carriages one superimposed upon the other, means for extending one of the carriages one half its length from the elevator, means for extending the other carriage one half its length beyond the extended first carriage, said means for extending the one carriage comprising a driver element lying within an opening of the elevator and actuating devices for pivoting the driving element in a vertical plane to extend the first carriage, said extending means adapted when moved to its unextended position to withdraw the first carriage.

2. In an automobile parking arrangement, a building structure having a section adapted to permit the vertical travel on elevators and a section to one side of the first section adapted to receive and store the automobiles, an elevator disposed in said first section for vertical travel adapted to receive an automobile and be elevated to a parking section, and car handling mechanism upon the elevator including arms adapted to be rotated from a vertical position to a horizontal position to engage opposite ends of the automobile positioned on the elevator, said mechanism adapted to be extended off the elevator to push the automobile into an adjacent parking space and onto the elevator to pull an automobile from the parking section, and means on the elevator for actuating said car handling mechanism, said car handling mechanism including two carriages one superimposed upon the other, means for extending one of the carriages one half its length from the elevator, means for extending the other carriage one half its length beyond the extended first carriage, said means for extending the one carriage comprising a driver element lying within an opening of the elevator and actuating devices for pivoting the driving element in a vertical plane to extend the first carriage, said extending means adapted when moved to its unextended position to withdraw the first carriage, said means for extending the other carriage comprising teeth formations disposed in opposing relationship respectively upon the elevator structure and upon the carriage structure, and an intermediate gear meshed with the teeth formations so that as the gear is driven over the teeth formation on the elevator structure by movement of the first carriage the formation on the second carriage will cause the second carriage to be extended.

3. In an automobile parking arrangement, a building structure having a section adapted to permit vertical travel on elevators and a section to one side of the first section adapted to receive and store automobiles, an elevator disposed in said first section for vertical travel adapted to receive an automobile and be elevated to a parking section, a car handling mechanism upon the elevator including arms adapted to be rotated from a vertical position to a horizontal position to engage opposite ends of the automobile positioned on the elevator, said mechanism adapted to be extended off the elevator to push the automobile into an adjacent parking space and onto the elevator to pull an automobile from the parking section, means on the elevator for actuating said car handling mechanism, said car handling mechanism including means for operating said arms, said arm operating means comprising a cylinder device extended longitudinally of the elevator and journalled thereto for rotation about its axis, said arms being connected to the opposite ends of the cylinder device whereby as the cylinder device is rotated it swings said arms from a vertical position to a horizontal position or vice versa, and an operating arm being connected to the cylinder device for rotating the same.

4. In an automobile parking arrangement, a building structure having a section adapted to permit vertical travel on elevators and a section to one side of the first section adapted to receive and store automobiles, an elevator disposed in said first section for vertical travel adapted to receive an automobile and be elevated to a parking section, car handling mechanism upon the elevator including arms adapted to be rotated from a vertical position to a horizontal position to engage opposite ends of the automobile positioned on the elevator, said mechanism adapted to be extended off the elevator to push the automobile into an adjacent parking space and onto the elevator to pull an automobile from the parking section, means on the elevator for actuating said car handling mechanism, said car handling mechanism including means for operating said arms, said arm operating means comprising a cylinder device extended longitudinally of the elevator and journalled thereto for rotation about its axis, said arms being connected to the opposite ends of the cylinder device whereby as the cylinder device is rotated it swings said arms from a vertical position to a horizontal position or vice versa, an operating arm connected to the cylinder device for rotating the same, said cylinder device having rods connected to the exterior of it and adapted for longitudinal movement therealong, said arms for contacting the automobile ends being pivotally connected to the ends of the cylinder device for rotation about a transverse axis, said rods connected with the arms to pivot the same, and actuating means cooperating with the inner ends of the rods to effect their outward actuation when the arms have been swung to their horizontal position whereby to tighten the arms upon the ends of the automobile.

5. In an automobile parking arrangement, a building structure having a section adapted to permit vertical travel on elevators and a section to one side of the first section adapted to receive and store automobiles, an elevator disposed in said first section for vertical travel adapted to receive an automobile and be elevated to a parking section, car handling mechanism upon the elevator including arms adapted to be rotated from a vertical position to a horizontal position to engage opposite ends of the automobile positioned on the elevator, said mechanism adapted to be extended off the elevator to push the automobile into an adjacent parking space and onto the elevator to pull an automobile from the parking section, means on the elevator for actuating said car handling mechanism, said car handling mechanism including means for operating said arms, said arm operating means comprising a cylinder device extended longitudinally of the elevator and journalled thereto for rotation about its axis, said arms being connected to the opposite ends of the cylinder device whereby as the cylinder device is rotated it swings said arms from a vertical position to a horizontal position or vice versa, and an operating arm connected to the cylinder device for rotating the same, said cylinder device having rods connected to the exterior of it and adapted for longitudinal movement therealong, said arms for contacting the automobile ends being pivotally connected to the ends of the cylinder device for rotation about a transverse axis, said rods connected with the arms to pivot the same, and actuating means cooperating with the inner ends of the rods to effect their outward actuation when the arms have been swung to their horizontal position whereby to tighten the arms upon the ends of the automobile, said rods having a spring means in their connection with the arms whereby a yielding pressure will be applied upon the automobile ends thereby to protect the car and prevent breakage of said rods and said arms.

FRANK MARIANO.

REFERENCES CITED

The following references are of record in the file of this patent:

UNITED STATES PATENTS

| Number | Name | Date |
|---|---|---|
| 2,303,656 | Orr | Dec. 1, 1942 |
| 2,428,856 | Sinclair | Oct. 14, 1947 |